United States Patent
Kang et al.

(10) Patent No.: US 10,110,510 B2
(45) Date of Patent: Oct. 23, 2018

(54) METHOD AND APPARATUS FOR SECURITY DOMAIN MANAGEMENT IN TRUSTED EXECUTION ENVIRONMENT

(71) Applicant: Samsung Electronics Co., Ltd., Gyeonggi-do (KR)

(72) Inventors: Bo Gyeong Kang, Seoul (KR); Byung Rae Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 213 days.

(21) Appl. No.: 14/494,262

(22) Filed: Sep. 23, 2014

(65) Prior Publication Data

US 2015/0089069 A1    Mar. 26, 2015

(30) Foreign Application Priority Data

Sep. 24, 2013  (KR) .......................... 10-2013-0113285

(51) Int. Cl.
*H04L 12/911* (2013.01)
*H04L 29/08* (2006.01)
*G06F 21/71* (2013.01)

(52) U.S. Cl.
CPC .............. *H04L 47/82* (2013.01); *G06F 21/71* (2013.01); *H04L 67/26* (2013.01)

(58) Field of Classification Search
CPC .......... H04L 47/82; H04L 67/26; G06F 21/71
See application file for complete search history.

(56) References Cited

U.S. PATENT DOCUMENTS

| | | | |
|---|---|---|---|
| 7,243,230 B2 | 7/2007 | England et al. | |
| 8,074,262 B2 | 12/2011 | Scarlata | |
| 8,271,996 B1 | 9/2012 | Gould et al. | |
| 9,852,299 B2 * | 12/2017 | Nellitheertha | G06F 21/602 |
| 9,953,165 B2 * | 4/2018 | Prakash | G06F 21/572 |
| 2003/0097558 A1 | 5/2003 | England et al. | |
| 2005/0223413 A1 * | 10/2005 | Duggan | G06F 21/6236 726/3 |
| 2007/0094719 A1 | 4/2007 | Scarlata | |
| 2007/0143219 A1 * | 6/2007 | Shen | G06F 21/10 705/52 |
| 2009/0106771 A1 * | 4/2009 | Benner | G06F 12/1466 719/313 |

(Continued)

OTHER PUBLICATIONS

GlobalPlatform GlobalPlatform Device Technology TEE System Architecture Version 1.0 Public Release Dec. 2011 Document Reference: GPD SPE 009.*

(Continued)

*Primary Examiner* — Dustin Nguyen
*Assistant Examiner* — Javier O Guzman
(74) *Attorney, Agent, or Firm* — The Farrell Law Firm, P.C.

(57) ABSTRACT

A security domain management method and apparatus for managing at least one security domain in a trusted execution environment (TEE) including at least one security domain is provided. The method includes obtaining information related to an event for an arbitrary security domain when the event for the arbitrary security domain is generated; and transmitting the information related to the event to at least one other security domain, wherein the information related to the event is sent via a TEE kernel.

18 Claims, 11 Drawing Sheets

(56) References Cited

U.S. PATENT DOCUMENTS

| | | | | |
|---|---|---|---|---|
| 2009/0259857 | A1* | 10/2009 | Gehrmann | G06F 21/10 |
| | | | | 713/193 |
| 2010/0192217 | A1* | 7/2010 | Arnold | H04L 63/105 |
| | | | | 726/13 |
| 2013/0311764 | A1* | 11/2013 | Alpert | H04L 9/0816 |
| | | | | 713/150 |
| 2013/0326614 | A1* | 12/2013 | Truskovsky | G06F 21/44 |
| | | | | 726/19 |
| 2013/0339729 | A1* | 12/2013 | Novak | G06F 21/57 |
| | | | | 713/167 |
| 2014/0095867 | A1* | 4/2014 | Smith | H04L 9/0822 |
| | | | | 713/164 |
| 2014/0337918 | A1* | 11/2014 | Siddiqi | G06F 21/56 |
| | | | | 726/3 |
| 2015/0289134 | A1* | 10/2015 | Johnston | H04M 1/673 |
| | | | | 380/270 |
| 2015/0350219 | A1* | 12/2015 | Selander | H04L 63/102 |
| | | | | 726/1 |

OTHER PUBLICATIONS

"GlobalPlatform Device Technology TEE System Architecture", Version 1.0, Public Release, XP55117057, Dec. 1, 2011.
European Search Report dated Feb. 19, 2015 issued in counterpart application No. 14189981.9-1853.

* cited by examiner

METHOD AND APPARATUS FOR SECURITY DOMAIN MANAGEMENT IN TRUSTED EXECUTION ENVIRONMENT

PRIORITY

This application claims priority under 35 U.S.C. § 119(a) to a Korean Patent Application filed on Sep. 24, 2013 in the Korean Intellectual Property Office and assigned Serial No. 10-2013-0113285, the entire contents of which are incorporated herein by reference.

BACKGROUND

1. Field of the Invention

The present invention relates generally to a method and apparatus for security domain management in a trusted execution environment, and more particularly, to a method and an apparatus for controlling a communication between the security domains.

2. Description of the Related Art

A current GlobalPlatform™ standard 1.0 defines a Trusted Execution Environment (TEE).

FIG. 1 is a diagram illustrating an example of a TEE management structure.

Referring to FIG. 1, the TEE defined by the standard specifies a configuration of a security domain within the TEE to assign a security right, and manage a life cycle of trusted applications according to the assigned security right. Each security domain is strictly isolated, and is configured in such a manner to prevent the mutual exchange of information.

The security domain represents each managing entity within a terminal, and may be configured in several ways. A typical approach is that an application mounted in the TEE executes functions on behalf of a remote rights holder. In this case, when manufacturing a terminal, a terminal manufacturer may implement a built-in security domain application in the terminal, so that a lifecycle (e.g., lock, unlock, update, etc.) of the TEE and other security domains may be managed by using the built-in security domain application.

A trusted application provider enables a security domain to be controlled under management of a specific domain or a root domain. Accordingly, when a service, such as a user terminal change or a security domain migration by a security domain manager, is performed, ally domains (i.e., a domain defined as having an association relationship with a corresponding domain) may not be able to perform a necessary service as they are not able to recognize the service.

SUMMARY

The present invention has been made address the above disadvantages and to provide at least the advantages described below.

Accordingly, an aspect of the present invention is to provide a method for sharing minimum information between security domains.

In accordance with an aspect of the present invention, a security domain management method for managing at least one security domain in a trusted execution environment (TEE) including the at least one security domain is provided. The method includes obtaining information related to an event for an arbitrary security domain when the event for the arbitrary security event is generated; and transmitting the information related to the event to at least one other security domain, wherein the information related to the event is sent via a TEE kernel.

In accordance with another aspect of the present invention, a security domain management apparatus for managing at least one security domain in a trusted execution environment including the at least one security domain is provided. The apparatus includes a storage unit configured to store at least one security domain; and a controller configured to obtain information related to an event for an arbitrary security domain, and transmit the information related to the event to at least one other security domain, when the event for the arbitrary security domain is generated, wherein the controller is further configured to transmit the information related to the event via a TEE kernel.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. The same reference numbers are used throughout the drawings to refer to the same or like parts. Detailed descriptions of well-known functions and structures incorporated herein are omitted to avoid obscuring the subject matter of the present invention.

A Trusted Execution Environment (TEE) is an architecture for configuring an environment in which an application may be safely executed, and may be configured to include a hardware (H/W) standard specification, a Secure Operating System (OS), a Middle Ware, and an Internal Application Programming Interfaces (APIs), etc. to implement such an architecture.

In addition, a Trusted Application (TA) refers to an application registered and installed in the TEE.

A Security Domain (SD) refers to an area which is logically separated to manage the applications of the TEE, where each security domain is managed independently by using a different security key.

Lastly, an ally domain refers to a domain which is defined as having an association relationship with an arbitrary domain.

Figure 1:
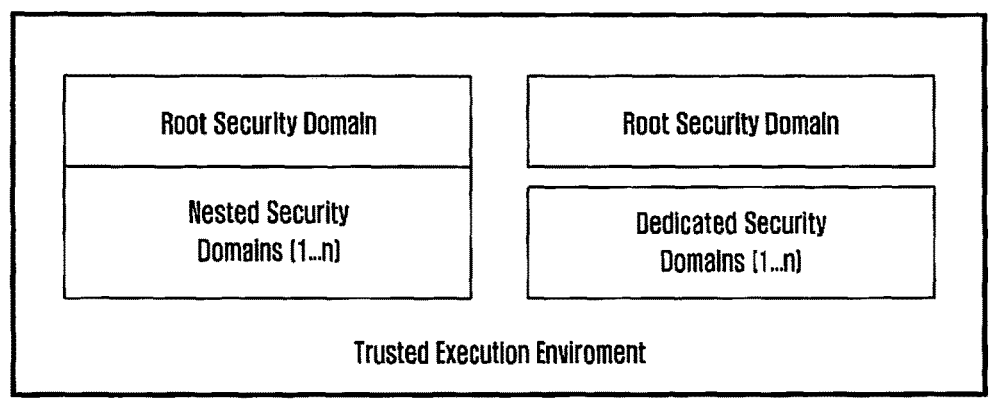
FIG. 1 is a block diagram illustrating a TEE management structure.
Figure 2:
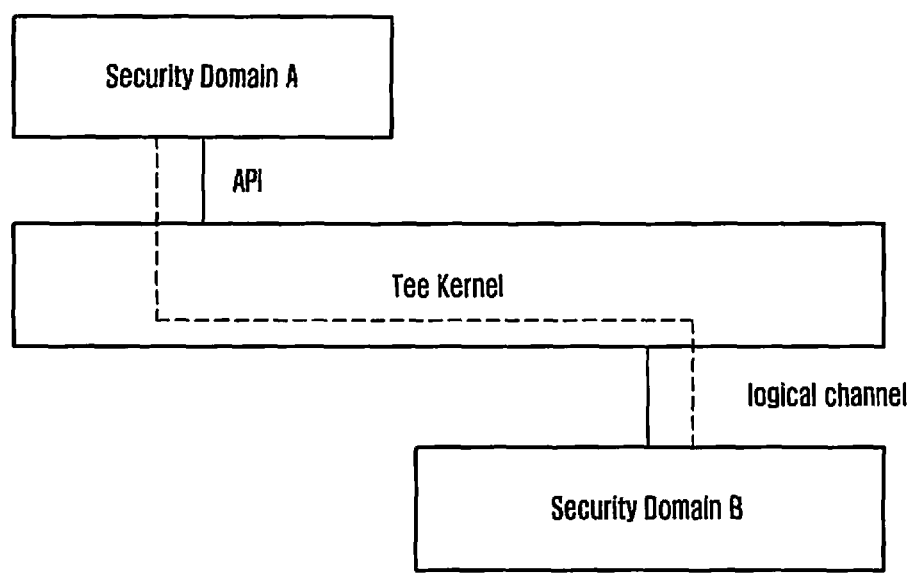
FIG. 2 is a block diagram of an information channel between security domains according to an embodiment of the present invention.

The security domains configuring the TEE may be composed of various combinations of a root security domain, a nested security domain, and forms having a specific function. Each form may have a different method of controlling a security domain and a different isolation type than another domain. However, in order to maintain the consistency of a TEE configuration, at least a minimum of information should be shared between the security domains, and to this end, as shown in FIG. 2, the present invention configures a TEE to form an information channel between security domains. The information channel serves as a path by which minimum information, which is mutually available between the security domains, migrates. The information channel is provided by a kernel (i.e., TEE kernel) that controls the TEE, where the kernel may be referred to as a controller in various embodiments of the present invention.

Hereinafter, a detailed configuration and information flow of an information channel is described.

Figure 3:
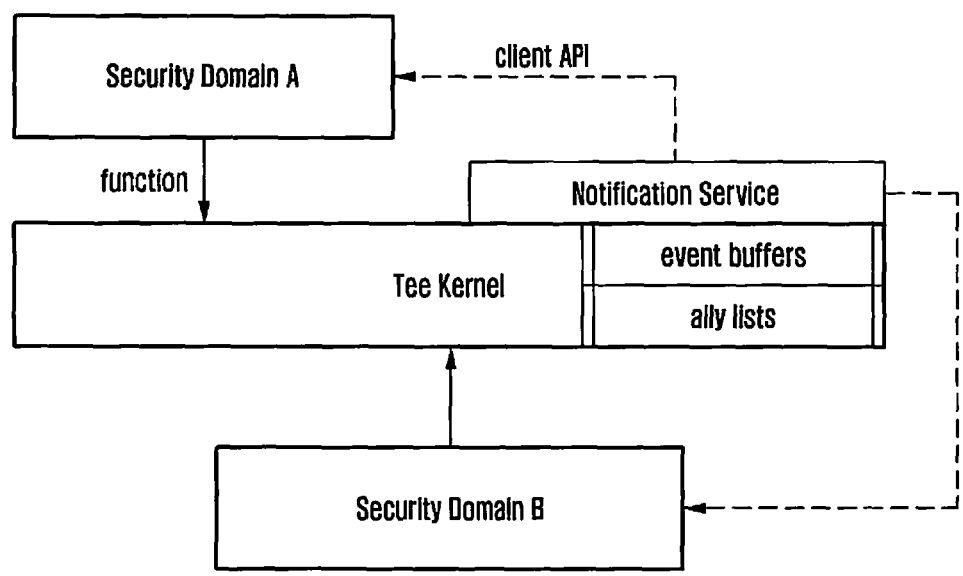
FIG. 3 is a block diagram illustrating an information channel according to an embodiment of the present invention.

FIG. 3 is a block diagram illustrating an information channel according to an embodiment of the present invention.

Examples of exchangeable information via an information channel between security domains is as follows:

1. Information related to TEE scheduling or maintenance.
2. Information related to an ownership change and a security domain migration.
3. Information related to a state change (in the case of mutual dependence between services, and in the case of sharing a TA) of a relevant security domain or a connected TA.

An information channel between security domains may be implemented via Functional APIs provided by the TEE Kernel. In this case, the information channel is a logical channel, and is not a direct communication channel between security domains.

Examples of a method for sharing event information corresponding to another security domain by a security domain via an information channel configuration as shown in FIG. 3 are as follows:

1. A method of directly sharing information from a source domain via a client API by an arbitrary security domain.
2. A method of generating and registering/managing its own specific event buffer by a security domain.
3. A method of being added to a security domain list to share information by registering with a notification service.

According to the third method above, by adding information indicating the usage of a notification service to an implementation property provided by a kernel, the security domain may be managed as the security domain with which the event information of another security domain will be shared via the notification service. The example of adding notification service to kernel property is as follows:

kernel_property→notification_service (e.g. gpd.tee.notificationService in GlobalPlatform TEE)

In this case, when the notification service is implemented by a TA, the security domain adds a Universally Unique Identifier (UUID) of the TA to the kernel property. When the security domain does not intend to implement the notification service, it designates the kernel property as a null value.

The reception of the notification for an event generated in another security domain by a security domain application may be set to be registered automatically. In this case, the property may be registered by the following method.

TA_property→notification_subscription (e.g. gpd.ta.notificationSubscription in GlobalPlatform TEE)

If the usage of a notification service by the security domain is not an opt-in option, the TA property is designated as a null value.

Hereinafter, a procedure of registering the security domain in the notification service use list of the TEE by using the notification service which is added to the property will be described in more detail with reference to FIG. 4.

In the present invention, information sharing via an information channel may be achieved between ally domains. However, the present invention is not limited to information sharing between ally domains, but may allocate the notification service to a system event buffer, and may maintain the notification service to be used TEE wide. In addition, in the TEE, the kernel and a security domain migration service are able to read or write to the system event buffer, and the TA and the security domain are managed to be able to only read the system event buffer.

In an embodiment of the present invention, according to the second method among the above mentioned three methods, each security domain is able to directly generate and manage a specific event buffer to notify its own state, in addition to the system event buffer. The event buffer for a specific security domain is managed so that another security domain is only able to read, except for the security domain that manages a corresponding event buffer, and other security domains are permitted access to a corresponding event buffer via the notification service.

The event buffer is generated into two types, public and private. The public event buffer is managed to freely perform subscription, and the private event buffer is managed to access only the security domain which is designated as an ally application by the buffer owner.

Hereinafter, according to the above described embodiment of the present invention, in a case in which the security domain uses the notification service, a registration method is described in more detail.

Figure 4:
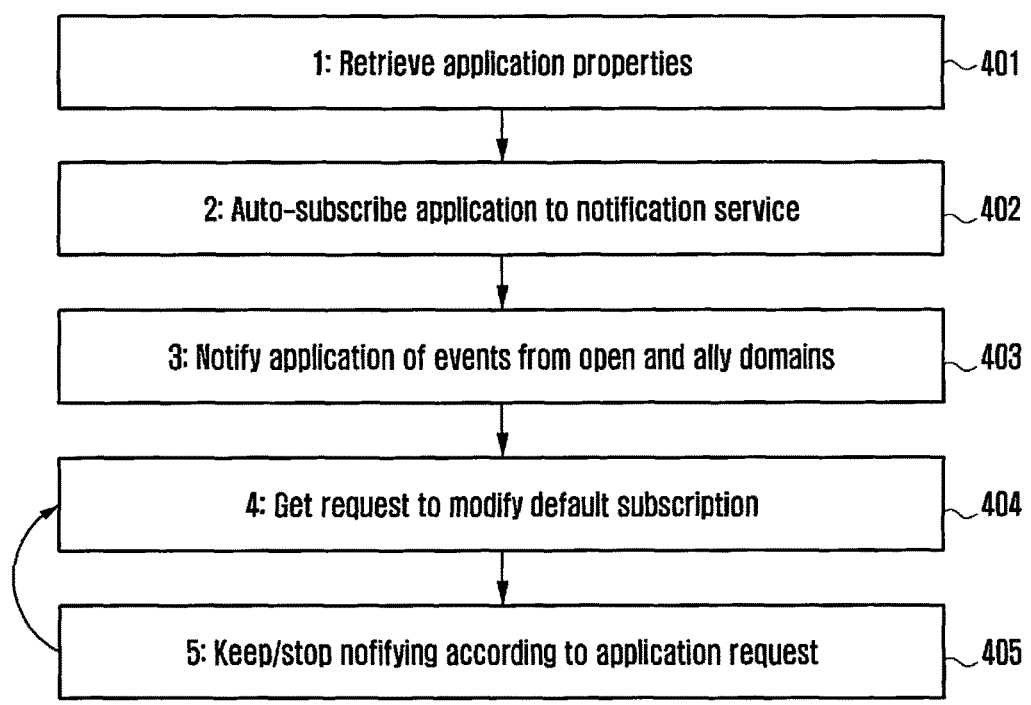
FIG. 4 is a flowchart of a method of registering and modifying a security domain to a notification service according to an embodiment of the present invention.

FIG. 4 is a flowchart of a method of registering and modifying a security domain in a notification service according to an embodiment of the present invention.

A notification service registration procedure of FIG. 4 is performed when a security domain application is installed. In detail, when installing the security domain application, the TEE kernel check a TA_property value set by a domain owner via the notification service in step 401.

In step 402, based on the identification result, when the TA property value is not NULL, the TEE kernel registers a corresponding security domain in the notification service so that the security domain application may receive a notification including information related to an event from all security domains using the public event buffer and the domains which are designated by an ally domain application. The registration of a corresponding security domain in the notification service by the TEE kernel according to the property value may correspond to an auto registration, because the TEE kernel registers the security domain by itself, without any external intervention.

In step 403, if the security domain is registered in the notification service, thereafter, the notification service notifies of information related to an event generated from an arbitrary security domain to the registered security domain according to registration information.

In step 404, when the notification service is provided, the notification service receives a modification request corresponding to the content which is automatically registered in the notification service from the security domain. In this case, the security domain adds or cancels the registration of the arbitrary event buffer, or requests a termination of a push notification for event information.

In step 405, when receiving the modification request, the notification service performs the notification service of the security domain according to newly registered information according to the modification request.

Next, a management method, where the security domain generates and manages each event buffer separately, is described in detail.

Figure 5:
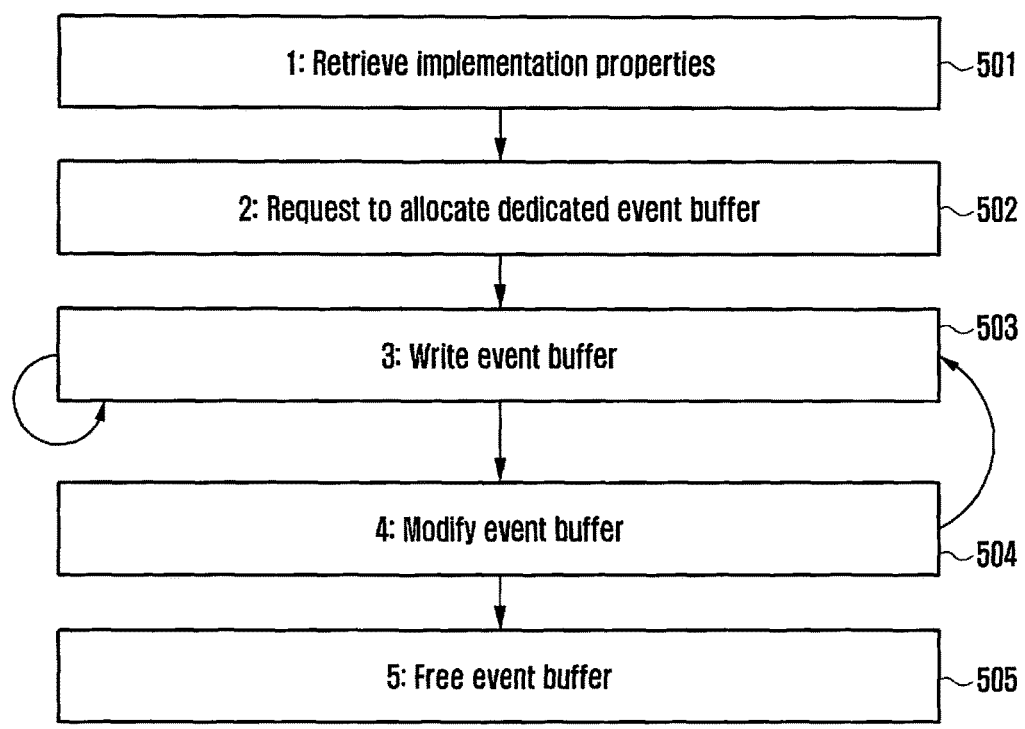
FIG. 5 is a flowchart of a method of managing an event buffer by a security domain according to an embodiment of the present invention.

FIG. 5 is a flowchart of a method of managing an event buffer by a security domain according to an embodiment of the present invention.

Referring to FIG. 5, the security domain application retrieves kernel property→notification_service information in step 501.

Based on the retrieval result, when the kernel property is not a null value, the security domain application requests the TEE kernel to allocate a specific event buffer dedicated to the security domain application in step 502. The TEE kernel which received the request generates an event buffer for a corresponding security domain, and allocates the generated event buffer to a corresponding security domain.

Then, the security domain application generates an ally domain list corresponding to the security domain, and provides the ally domain list to the TEE kernel. In addition, the security domain application identifies a list of the domains that may receive the notification service in addition to the ally domain which has a relationship with the security domain application.

In step 503, the security domain updates information related to the event into the event buffer, which is allocated to the security domain when the event is generated during the security domain application operation. The event that may be generated in the security domain may be, for example, a security domain migration by a domain manager.

When the event buffer is updated, the security domains registered in the ally domain list of the corresponding security domain obtain event information by accessing a corresponding event buffer, or receive event information via the TEE kernel. Then, the security domain obtains event information via an information channel provided by the TEE kernel. Thus, in the TEE according to the present invention, the security domains share event information mutually by using the information channel.

In step 504, the security domain updates and manages the ally domain list during a life time of the event buffer. By modifying the ally domain list of the event buffer, the security domain selects/manages a security domain with which the event generation fact is shared.

In step 505, when the lift time of the event buffer is terminated, the security domain deletes the event buffer allocated to the TEE kernel, and requests release of memory.

The TEE kernel that received the request deletes the event buffer allocated for a corresponding security domain.

Hereinafter, the method of obtaining event information by accessing the event buffer for a specific domain by a security domain registered as an ally domain for the specific security domain will be described in more detail.

Figure 6:
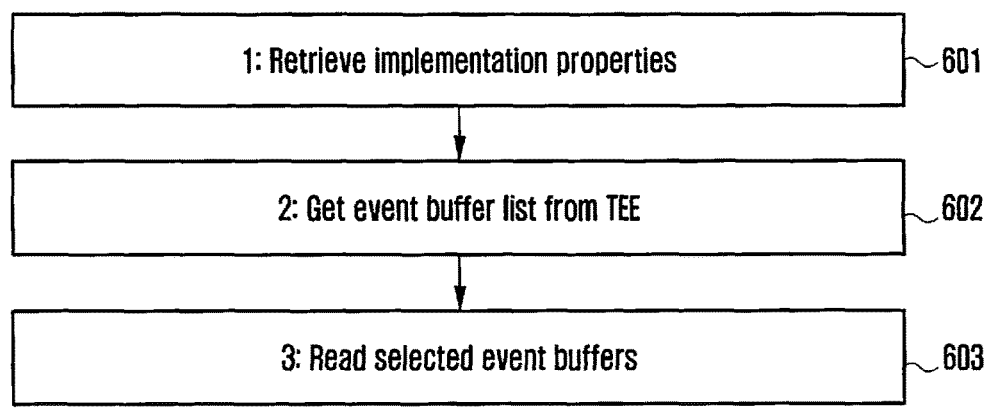
FIG. 6 is a flowchart of a method of searching a readable event buffer by a security domain according to an embodiment of the present invention.

FIG. 6 is a flowchart of a method of searching a readable event buffer by a security domain according to an embodiment of the present invention.

Referring to FIG. 6, the security domain application retrieves kernel_property→notification_service information at step 601.

Based on the retrieval result, when the corresponding kernel property value is not NULL, the security domain gets the event buffer list by requesting the event buffer list of the notification service in step 602. That is, the security domain is registered as a public type event buffer of the ally domain that has an association relationship with the security domain itself, and requests the list of event buffers to which the security domain itself is able to access. The notification service, which received the request, returns information related to the public event buffer and event buffers allocated to the ally domain of the corresponding security domain to the security domain.

In step 603, the security domain obtains event information from the event buffers which exist in the list by using the received event buffer list. That is, the security domain directly fetches event information via an information channel by accessing the event buffer in the list, or receives event information by requesting information of the corresponding event buffers to the TEE kernel.

Figure 7:
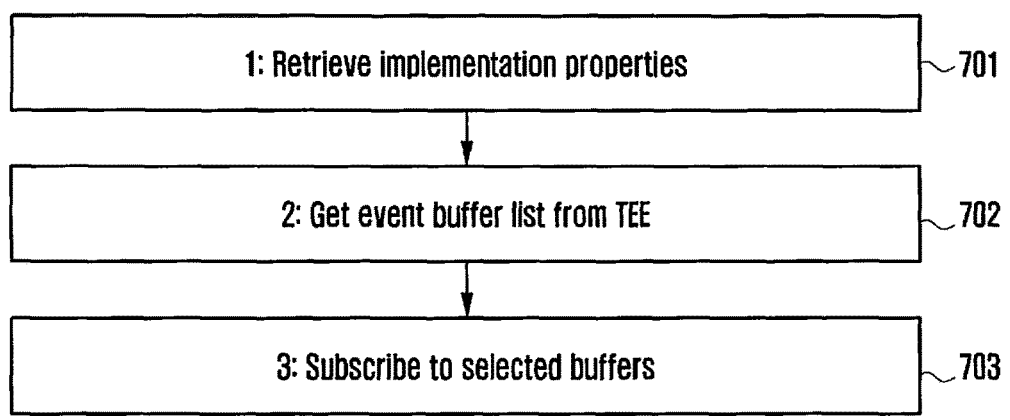
FIG. 7 is a flowchart of a method of searching and registering readable event buffers by a security domain according to an embodiment of the present invention.

FIG. 7 is a flowchart of a method of searching and registering readable event buffers by a security domain according to an embodiment of the present invention.

Referring to FIG. 7, the security domain application retrieves kernel_property→notification_service information in step 701.

When a corresponding property value is not null, the security domain requests the event buffer list of the notification service in step 702. The notification service provides information, related to buffers of all public/ally domains with respect to a corresponding security domain, to the security domain.

In step 703, the security domain registers itself with the selected buffer as the ally domain by using an Interface (I/F) of the notification service.

Hereinafter, various functions that may be used by the notification service in order to share information between the security domains in the TEE are defined.

The following is a list of the Interface functions for the notification service according to an embodiment of the present invention. A detailed parameter for each function may be added/modified according to an application.

(1) TEE_NotifyEvent (parameters as specified below);

Description:

It is a function defined to notify an event generated from a source domain to a security domain or a security domain group. The notification may be delivered via a push or a notification service.

Input parameters:

Identifier (UUIDs) of a target security domain

Identifier (allies) of a target domains group

Deliver an event notification to all domains when Identifier is not specified.

Event descriptor

Output parameters:

None (2) TEE_AllocateEventBuffer (parameters as specified below);

Description:

It is a function defined to allocate a sharing event buffer in order to save an event descriptor by TEE Kernel.

Input parameters:

A size of a requested event buffer.

Private buffer bit: A private buffer is read as a TEE-GetEventBufferList( ) when a requester exists in an ally domain list.

Identifier(s): Information related to an ally domain that is permitted to use a corresponding event buffer Output parameters:

Request status

Pointer of sharing event buffer (3) TEE_FreeEventBuffer (parameters as specified below);

Description:

It is a function defined to release an event buffer allocation.

Input parameters:

Public/private buffer bit (optional): Instruct an allocation release of a buffer. All of a public/private buffer may be set to free when the bit is not specified.

Output parameters:

Request status (4) TEE_GetEventBufferList (parameters as specified below)

Description:

It is a function defined to return identifiers of a security domain related to public event buffers.

Input parameters:

None

Output parameters:

Identifiers of security domains related to pointers of public buffers.

(5) TEE_RegisterEventBuffers (parameters as specified below)

Description:

It is a function defined to register push information related to an event buffer update in a notification service by a security domain.

Input parameters:

Identifiers of a security domain having an event buffer

Output parameters:

Request status (6) TEE_UnregisterEventBuffers (parameters as specified below)

Description:

A function defined to release a registration of a push notification

Input parameters:

Identifiers of a security domain having an event buffer

Release a registration of all notifications when identifier is not registered.

Output parameters:

Request status (7) TEE_ModifyEventBuffer (parameters as specified below)

Description:

It is a function defined to update a list of ally domains related to a private event buffer.

Input parameters:

Identifier list of ally domains to be updated

Output parameters:

Request status

Figure 8:
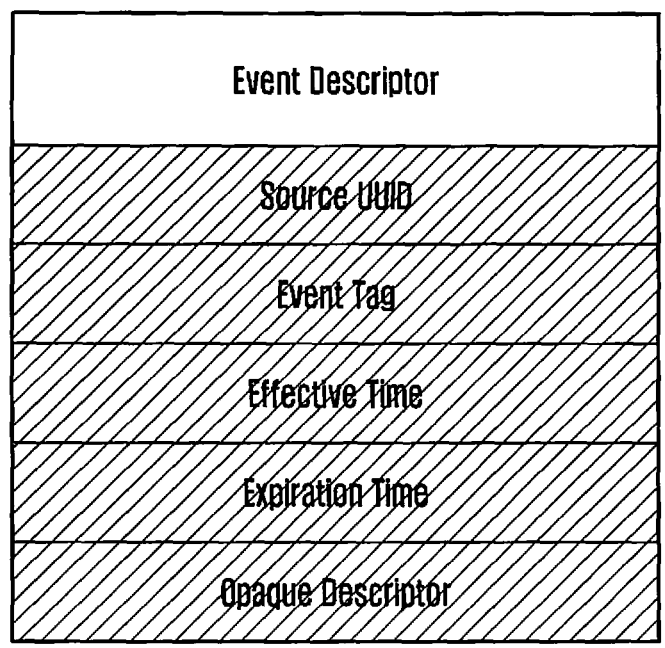
FIG. 8 is a diagram illustrating an event descriptor according to an embodiment of the present invention.

FIG. 8 is a diagram illustrating an event descriptor according to an embodiment of the present invention.

Referring to FIG. 8, the event descriptor is configured to include a UUID of a source security domain application, an event tag, a timestamp that signifies a start and end of an effective period, and an opaque descriptor which includes other information.

Figure 9:
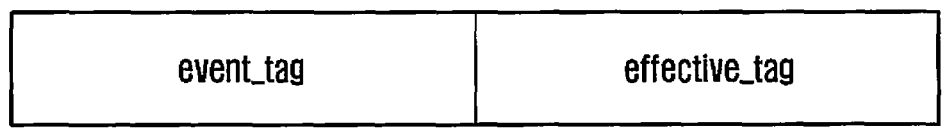
FIG. 9 is a diagram illustrating an event descriptor according to an embodiment of the present invention.

FIG. 9 is a diagram illustrating an event descriptor according to an embodiment of the present invention.

Referring to FIG. 9, the event descriptor is defined for an effective event scheduling between the ally domains as a simplified form of the event descriptor of FIG. 8.

The event_tag (6 bits) is information related to an identifier of an event, and includes the following three sub parameters.

System wide events that are posted to a system event buffer

TEE implementation specific events that are posted to a system and security domain event buffers Security domain dedicated events that are posted within a private buffer Effective_tag (2 bits) is used for a scheduling of a control parameter, and includes the following values.

"00"—Scheduling of an event is implemented immediately after the event

"01"—Scheduling of an event is implemented for a specific time. The event is scheduled to start in a preset period.

"10"—An event is performed when receiving an arbitrary response. For example, when receiving an agreement of an ally domain, the event is generated.

"11"—An event is reserved for a specific scheduling time.

Figure 10:
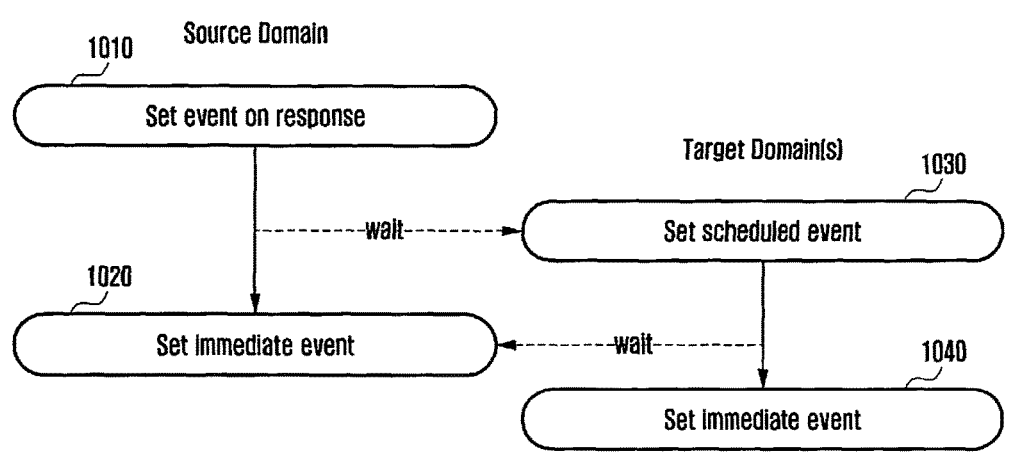
FIG. 10 is a flowchart of a method of scheduling an event by using an effective_tag parameter between ally security domains according to an embodiment of the present invention.

FIG. 10 is a flowchart of a method of scheduling an event by using an effective_tag parameter between ally security domains according to an embodiment of the present invention.

Referring to FIG. 10, first, the source security domain defines an internal event subsequent to an event of the ally domains. To this end, the source security domain sets the effective_tag parameter to "10", and records it in the private event buffer.

A target security domain prepares a response after the source security domain notifies of information related to a defined event to the target security domain, in step 1010. That is, the target security domain sets the effective_tag parameter to "01", and generates an event scheduling descriptor to load into a private or public buffer.

The source security domain collects the notifications of the interested ally security domains, and initiates an execution of a response event when the response is requested, in step 1020. To this end, the source security domain sets the effective_tag parameter to "00", and generates an event scheduling description to load into the private or public buffer.

The target domain acknowledges this event, and initiates an execution of a response event, in step 1030 and step 1040. To this end, the target event sets the effective_tag parameter to "11", and generates an event scheduling description to load into the private or public buffer.

Figure 11:
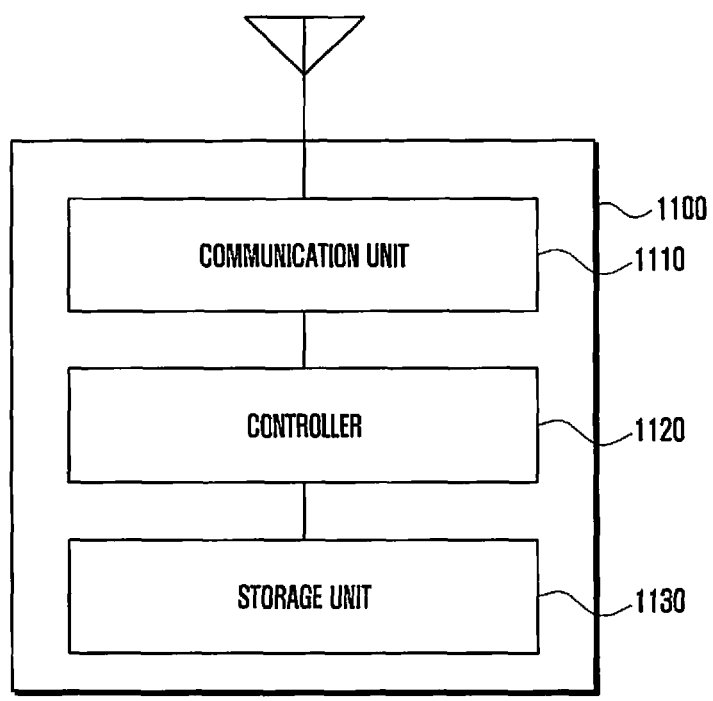
FIG. 11 is a block diagram of a security domain management apparatus according to an embodiment of the present invention.

FIG. 11 is a block diagram of a security domain management apparatus according to an embodiment of the present invention.

Referring to FIG. 11, the security domain management apparatus 1100 that performs an operation according to an embodiment of the present invention is configured to include a communication unit 1110, a controller 1120, and a storage unit 1130.

The communication unit 1110 is configured to communicate data with an external apparatus. Via the data communication with the external apparatus, the communication unit 1110 downloads a security domain and a security application related to the security domain, or transmits to another apparatus.

The controller 1120 controls other elements to perform an operation according to an embodiment of the present invention.

In detail, the controller 1120 manages at least one security domain in a TEE that includes at least one security domain. When an event for an arbitrary security domain is generated, the controller 1120 obtains information related to an event from a corresponding security domain, and delivers the information related to the event to at least one other domain. The controller 1120 may be a TEE kernel, may be configured to include a TEE kernel, and may deliver the information related to the event to the security domain via an information channel which is generated and provided by the TEE kernel. Information that can be transmitted via the information channel may be, for example, information related to scheduling, maintenance, ownership change, domain migration, a state change of a security application or another security domain related to the arbitrary security domain, or the like.

In an embodiment of the present invention, the controller 1120 registers the security domain in the notification service when installing the security domain. The controller 1120 obtains property information of the security domain desired to be installed, and registers the security domain in the notification service according to the property information so that a corresponding security domain may receive event information generated from another security domain. The property information of the security domain may be, for example, a TA_property, and the controller 1120 may register a corresponding security domain in the notification service when the TA_property value is not null. In this case, the notification of event information may be implemented via a TEE_NotifyEvent function.

Alternatively, in an embodiment of the present invention, the controller 1120 generates and allocates a specific event buffer for each security domain, and enables other security domains to share event information via the event buffer. When receiving an event buffer allocation request from an arbitrary security domain, the controller 1120 generates an event buffer for a corresponding security domain to allocate to the security domain. In this case, the buffer allocation may be implemented via a TEE_AllocateEventBuffer function. When an event is generated, the security domain updates event information in an event buffer allocated to the security domain itself. When the event buffer is renewed, the controller 1120 is able to notify of the renewal of the event buffer to other security domains via a push notification, which may be implemented by a TEE_RegisterEventBuffers function.

The controller 1120 generates and manages an ally domain list of the security domain to which an event buffer is allocated by connecting to the event buffer. When receiving a change/renewal request for the ally domain list from the security domain, the controller 1120 renews a corresponding list, and stores identification information of an ally domain desired to be added in the list. The change/renewal of the ally domain list may be implemented by a TEE_ModifyEventBuffer function.

When receiving a release request of an event buffer allocated to the controller 1120 from a security domain, the controller 1120 releases the event buffer allocated to the corresponding security domain. The release of the event buffer may be implemented by a TEE_FreeEventBuffer function.

The controller 1120 receives, from a security domain, a request of the event buffer list allocated to ally domains having an alliance with a corresponding security domain. In this case, the controller 1120 extracts an event buffer list, and transmits to a security domain via a TEE_GetEvenBufferList function.

The storage unit 1130 stores at least one security domain/security application. In addition, the storage unit 1130 stores a program code to implement the above described function, and the controller 1120 performs the above described operation by loading a code stored in the storage unit 1130.

A method and an apparatus for security domain management in a trusted execution environment according to the present invention enables the sharing of information between respective security domains, such that a managing entity may acknowledge and handle a situation where an incident generated in an arbitrary security domain can affect another security domain.

Although certain embodiments of the present invention have been described and illustrated in detail hereinabove, it should be clearly understood that many variations and modifications of the basic inventive concepts taught herein which may appear to those skilled in the present art will still fall within the spirit and scope of the present invention, as defined in the appended claims, and their equivalents.

What is claimed is:

1. A security domain management method for managing at least one security domain in a trusted execution environment (TEE) including the at least one security domain, comprising:
   obtaining property information related to a security domain;
   registering the security domain in a notification service to receive information related to an event, if the property information is not NULL;
   obtaining the information related to the event for a security domain if the event for the security domain is identified; and
   notifying at least one other security domain of the information related to the event for the security domain based on information for the notification service, the information for the notification service being determined based on a result of the registration,
   wherein the information related to the event is sent via a TEE kernel, and
   wherein the information for the notification service includes at least one identifier of the at least one other security domain, at least one group identifier of the at least one other security domain, an identifier of the security domain, and valid period information.

2. The method of claim 1, wherein the information comprises at least one of information related to scheduling, maintenance, ownership change, domain migration, or a state change of a security application or other security domain related to the security domain.

3. The method of claim 1, further comprising:
   receiving an event buffer allocation request for the security domain; and
   generating an event buffer for the security domain and allocating the event buffer to the security domain,
   wherein the information related to the event is updated in the event buffer allocated to the security domain if the event is identified.

4. The method of claim 3, further comprising:
generating a list of security domains associated with the security domain,
wherein transmitting the information related to the event comprises transmitting the information related to the event to at least one of the security domains included in the list.

5. The method of claim 4, further comprising:
receiving a renewal request for the list; and
registering identification information for a security domain to be added to the list in response to the renewal request.

6. The method of claim 3, further comprising:
receiving a release request of the event buffer allocated to the security domain from the security domain; and
releasing the event buffer.

7. The method of claim 3, further comprising:
transmitting a push notification to the at least one other security domain, if the information related to the event is updated.

8. The method of claim 1, further comprising:
receiving a request for an event buffer list allocated to security domains associated with the security domain from the security domain; and
transmitting the event buffer list to the security domain,
wherein the information related to the event of the security domain is transmitted to a security domain included in the event buffer list.

9. The method of claim 1, wherein the information for the notification service includes at least one of an event identifier, event scheduling information, or other information.

10. An apparatus for managing a security domain in a trusted execution environment including the security domain, comprising:
a storage unit configured to store at least one security domain; and
a controller configured to:
obtain property information related to the security domain,
register the security domain in a notification service to receive information related to an event, if the property information is not configured to NULL,
obtain the information related to the event for a security domain if the event for the security domain is identified, and
notify the information related to the event for the security domain to at least one other security domain based on information for the notification service, the information for the notification service being determined based on a result of the registration,
wherein the information related to the event is sent via a trusted execution environment (TEE) kernel, and
wherein the information for the notification service includes at least one identifier of the at least one other security domain, at least one group identifier of the at least one other security domain, an identifier of the security domain, and valid period information.

11. The apparatus of claim 10, wherein the information comprises at least one of information related to scheduling, maintenance, ownership change, domain migration, or a state change of a security application or other security domain related to the security domain.

12. The apparatus of claim 10, wherein the controller is configured to generate an event buffer for the security domain and allocate the event buffer to the security domain, if receiving an event buffer allocation request for the security domain, and
wherein the information related to the event is updated in the event buffer allocated to the security domain if the event is identified.

13. The apparatus of claim 12, wherein the controller is further configured to generate a list of security domains associated with the security domain, and transmit the information related to the event to at least one of the security domains included in the list.

14. The apparatus of claim 13, wherein the controller is configured to register identification information for a security domain to be added to the list in response to a renewal request, if receiving the renewal request for the list.

15. The apparatus of claim 12, wherein the controller is configured to release an allocation of the event buffer, if receiving a release request of the event buffer allocated to the security domain from the security domain.

16. The apparatus of claim 12, wherein the controller is configured to transmit a push notification to the at least one other security domain, if the information related to the event is updated.

17. The apparatus of claim 10, wherein the controller is configured to transmit the event buffer list to the security domain, if receiving a request for an event buffer list allocated to security domains associated with the security domain from the security domain, and
wherein the information related to the event of the security domain is transmitted to a security domain included in the event buffer list.

18. The apparatus of claim 10, wherein the information related for the notification service comprises at least one of an event identifier, event scheduling information, or other information.

* * * * *